United States Patent
Kornegay et al.

(10) Patent No.: US 7,457,920 B1
(45) Date of Patent: Nov. 25, 2008

(54) METHOD AND SYSTEM FOR CACHE EVICTION

(75) Inventors: Marcus Lathan Kornegay, Durham, NC (US); Ngan Ngoc Pham, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/020,531

(22) Filed: Jan. 26, 2008

(51) Int. Cl.
*G06F 12/00* (2006.01)

(52) U.S. Cl. .................. 711/133; 711/134; 711/135; 711/136; 711/159; 711/160

(58) Field of Classification Search ......... 711/133–136, 711/159–160
See application file for complete search history.

(56) References Cited

U.S. PATENT DOCUMENTS

| | | | |
|---|---|---|---|
| 6,314,498 | B1 | 11/2001 | Arimilli et al. |
| 6,393,525 | B1 * | 5/2002 | Wilkerson et al. ........... 711/136 |
| 6,591,347 | B2 * | 7/2003 | Tischler et al. .............. 711/134 |
| 6,681,295 | B1 | 1/2004 | Root et al. |
| 6,681,297 | B2 * | 1/2004 | Chauvel et al. ............. 711/130 |
| 6,751,706 | B2 * | 6/2004 | Chauvel et al. ............. 711/122 |
| 7,076,609 | B2 * | 7/2006 | Garg et al. .................. 711/120 |
| 2005/0071564 | A1 * | 3/2005 | Luick ......................... 711/121 |
| 2005/0135626 | A1 | 6/2005 | Ball et al. |
| 2007/0168617 | A1 | 7/2007 | Borkenhagen et al. |

OTHER PUBLICATIONS

Kharbutli, M. and Solihim, Y., "Counter-Based Cache Replacement Algorithms". 2005, IEEE, International Conference on Computer Design.*
"Last Level Cache (LLC) Performance . . . ", Jaleel, A. et al., High Performance Computer Architecture, 2006. The 12th International Symposium, Feb. 11-15, 2006 pp. 88-98.
"Exploring the Cache Design for Large Scale CMPs", Hsu, L. et al., Workshop dasCMP2005, the 38th Annual International Symp on Microarchitecture, Nov. 13, 2005, Barcelona.

* cited by examiner

*Primary Examiner*—Hong Kim
*Assistant Examiner*—Arpan Savla
(74) *Attorney, Agent, or Firm*—Maxvalueip LLC

(57) ABSTRACT

The proposed system and associated algorithm when implemented improves the processor cache miss rates and overall cache efficiency in multi-core environments in which multiple CPU's share a single cache structure (as an example). The cache efficiency will be improved by tracking CPU core loading patterns such as miss rate and minimum cache line load threshold levels. Using this information along with existing cache eviction method such as LRU, results in determining which cache line from which CPU is evicted from the shared cache when a capacity conflict arises. This methodology allows one to dynamically allocate shared cache entries to each core within the socket based on the particular core's frequency of shared cache usage.

1 Claim, 3 Drawing Sheets

METHOD AND SYSTEM FOR CACHE EVICTION

BACKGROUND OF THE INVENTION

Caches are fast memory modules often on the same chip and close to the central processing unit (CPU). Data and instructions used by the CPU are loaded in cache. The benefit of using cache is that the same data or next instructions (also loaded in cache) are readily available to the CPU and they don't have to be loaded from a slower main memory. When a CPU needs data which is already in the cache, it is called a "hit"; while if the data is not in cache and needs to be loaded from memory, it is called a "miss". For better performance, it is desired to increase hits and reduce misses.

Caches are also at various levels: L1 is the fastest and closest to the CPU; L2 feeds to L1 and it is not as fast; etc. LLC stands for Last-Level Cache which is farthest from the CPU but often on the same chip or on the next module.

When the processor is composed of multiple CPUs, the CPU cores may be sharing the cache with a limited space. The lines of data previously loaded in cache may have to be evicted to make room for new data to be loaded to the cache. Simple cache algorithms such as Least Recently Used (LRU) or Least Frequently Used (LFU) (to clear out cache lines to make room for new data) do not track individual CPU core loading patterns. When one CPU is much busier than another CPU, using these simple algorithms to determine cache line eviction priority can increase cache miss rates and hurt cache efficiency. The proposed algorithm will improve the processor cache miss rates and overall cache efficiency in multi-core environments in which multiple CPU's share a single cache structure most often on a single die.

SUMMARY OF THE INVENTION

This is a system targeted (as one embodiment) for multiple core CPUs sharing one shared cache and describes an eviction method based on the CPU usage pattern of cache combined with known methods such as LRU and determines the CPU core which should be targeted for LRU. Once a share cache load command is received, the cache area is examined and if the cache area is not full, the cache line is marked with the requester's CPU id and loaded in the shared cache, the cache load tracker (CLT) count for the requester's CPU is incremented, examined against a threshold and if this count exceeds the threshold all such count totals (for all CPUs) are reduced proportionally to protect them against an overflow.

If the cache area is full, all the cache line load (CLL) counts for all the CPU's are compared and if they are all equal, LRU cache line for a CPU not responsible for the load is evicted. If the CLL counts for all the CPU's are not equal, requesting CPU's cache performance thresholds, specifically CLL minimum and miss rate, are examined. If CLL minimum is exceeded or the miss rate are above the threshold, the LRU cache line loaded by a CPU with the highest number of CLL count is evicted. Otherwise, the LRU cache line for a CPU with the lowest load rate is evicted.

DETAILED DESCRIPTION OF THE PREFERRED EMBODIMENTS

This system (as one embodiment) describes a cache eviction method based on the CPU usage pattern of cache combined with known methods such as LRU and determines which CPU core should be targeted for LRU. This system is proposed for multiple core CPUs sharing a cache load tracker (CLT) module for the shared cache.

Every cache line loaded to cache is marked by the ID of the CPU core requesting its load to later be able to identify and evict the cache lines based on its original requesting CPU core or any identified CPU.

A cache load tracker (CLT) module is responsible for tracking the number of cache lines loaded (CLL) into cache per individual CPU core. CLT also measures the load or miss rate on a separate set of memory locations for each CPU core.

One way to achieve this is based on a running average over a predetermined number of most recent misses. For example, the rate of miss for each CPU core will be the number of loads requested by that core within the last predetermined number of misses. This requires storing the core IDs in the same predetermined number of first in first out (FIFO) queue memory locations in order to increase the rate for the latest requesting core and decrease the rate for the last outgoing one in the queue.

Alternatively, the rates per core could be based on the number of misses per core in a predetermined number of misses, having the rates updated only after a predetermined number of misses have been accumulated. This requires a counter corresponding to each core for counting the corresponding core miss events; transferring the value of the counters to the core miss rate memory locations and resetting their values to zero, every time a predetermined number of misses are accumulated.

Figure 1:
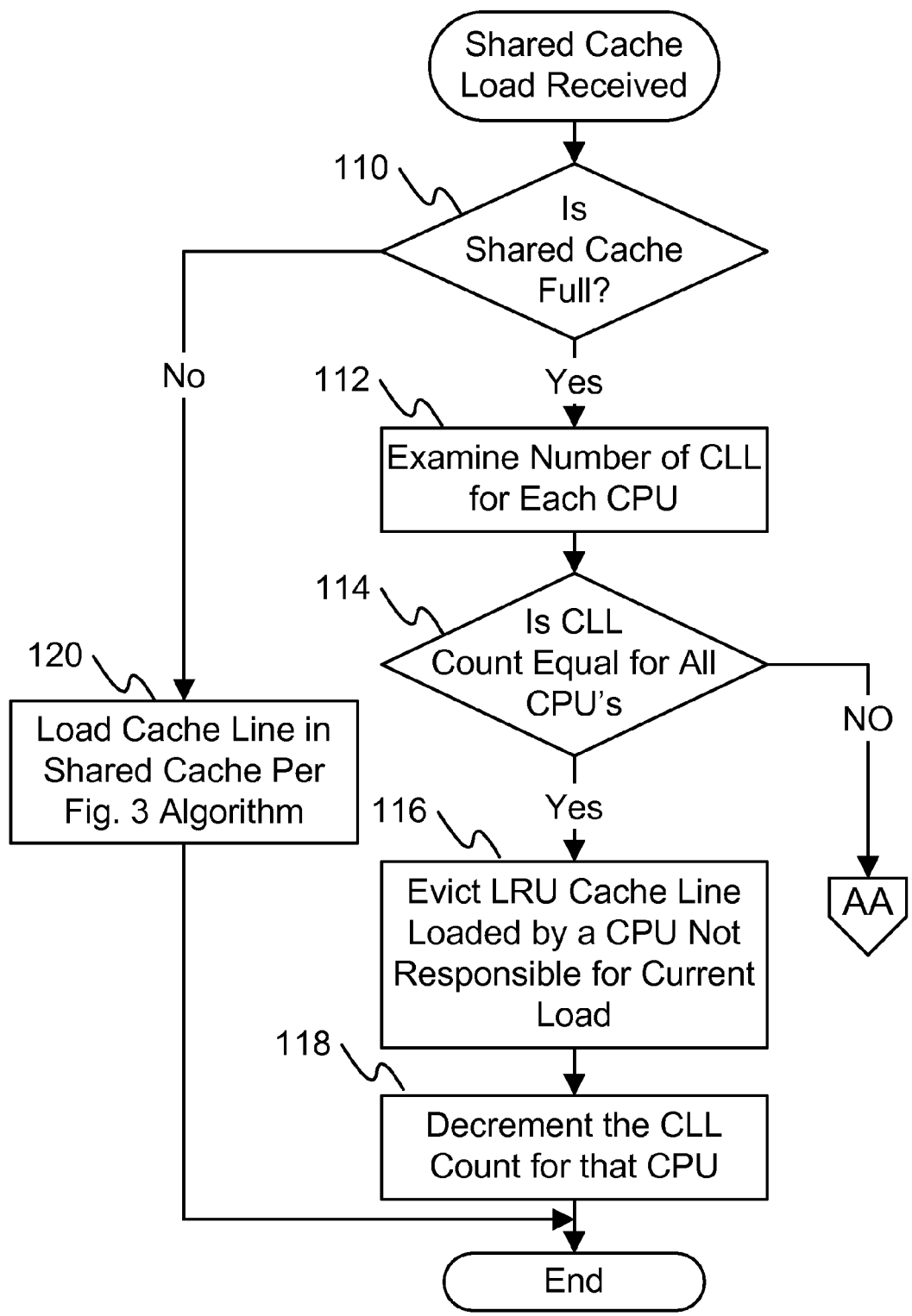
FIG. 1 is the flow diagram for cache eviction system.
Figure 2:
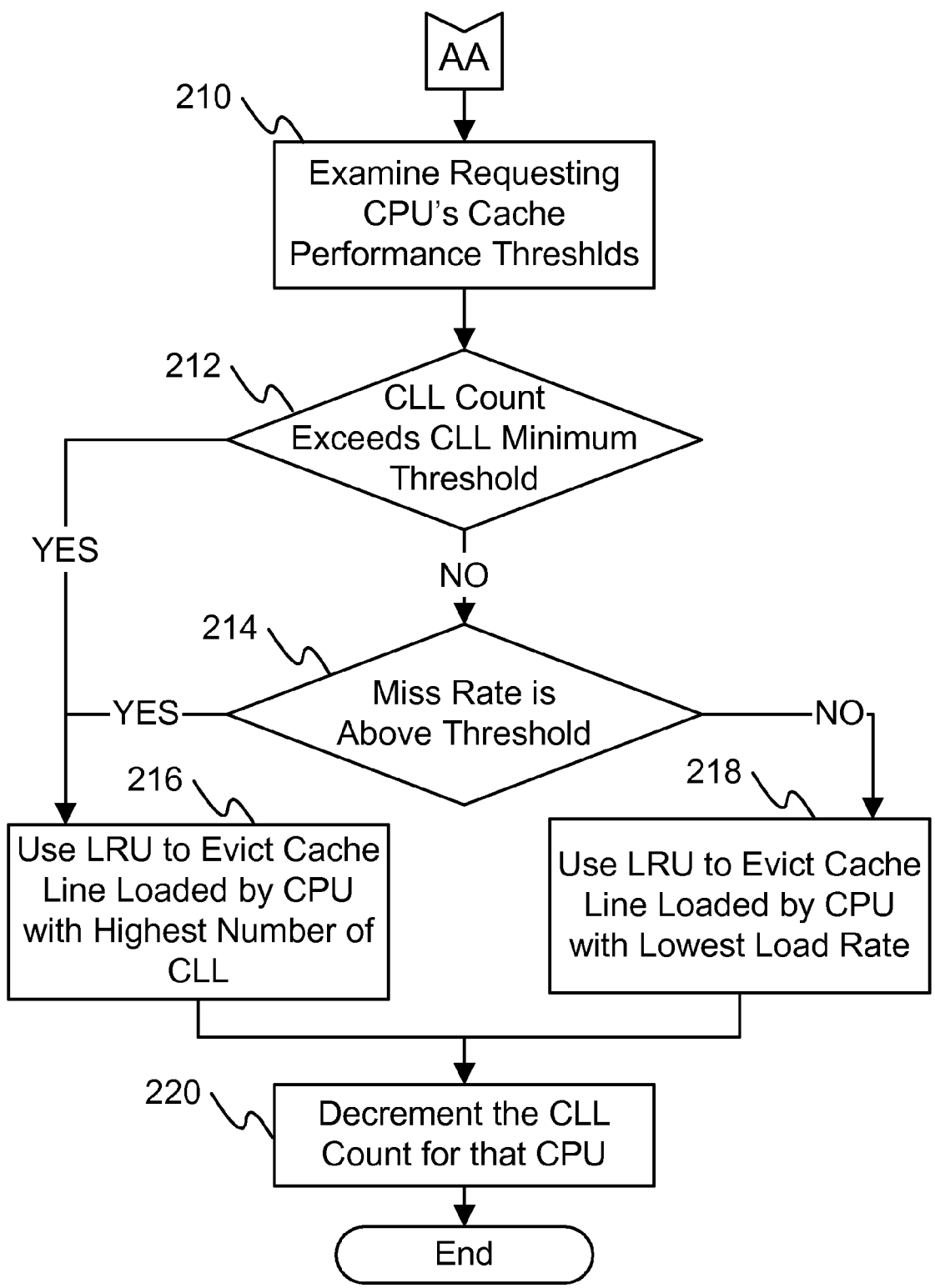
FIG. 2 is the continuation of the cache eviction system flow diagram.
Figure 3:
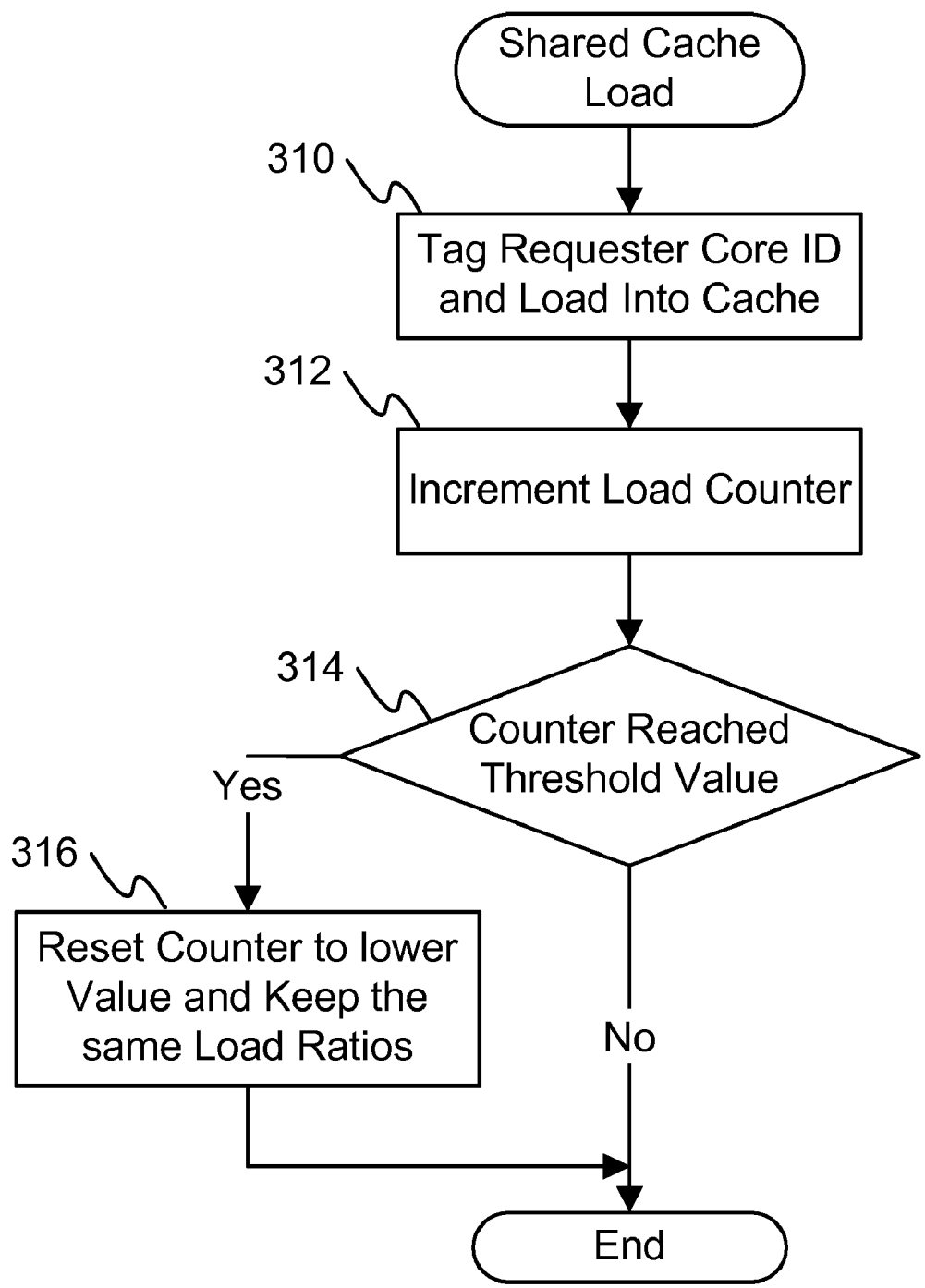
FIG. 3 is the load counter reset algorithm for this system.

The steps for this new eviction method are depicted in FIGS. 1, 2 and 3 and are as follows: Once a share cache load command is received, cache area is examined in FIG. 1 step 110 to determine if this area is full. If cache area is not full, cache line could be loaded (FIG. 1, step 120) and steps in algorithm depicted in FIG. 3 is executed: CLL is marked with the requester's CPU id and loaded in the shared cache as depicted in FIG. 3 step 310. CLL of the cache load tracker (CLT) for the requesters CPU is incremented in step 312 of FIG. 3. In step 314 of FIG. 3, this counter is examined to determine if the value has exceeded a threshold value. If the value has not exceeded the threshold, process is complete and algorithm ends. If the value has exceeded the threshold value, all such count totals (for all CPUs) are reduced proportionally (FIG. 3, step 316). This is required to protect the CLT counters against unwanted overflow.

Back on FIG. 1, step 110, if shared cache area is full, all the CLL counts for all the CPU's are examined (FIG. 1 step 112). If all the CLL counts for all the CPU's are equal (FIG. 1, step 114), LRU algorithm is used and a cache line from any of the other CPU's not responsible for this load is evicted (FIG. 1, step 116) and CLL counter for that CPU is decremented (FIG. 1, step 118). At this stage algorithm ends as new cache line could be loaded.

If CLL counts for all the CPU's were not equal (FIG. 1, step 114), the requesting CPU's cache performance thresholds are examined in FIG. 2, step 210. A first such threshold is the CLT's CLL minimum threshold value.

If CLT's CLL counter is more than a minimum threshold value (FIG. 2, step 212), LRU is applied to the cache lines corresponding to the CPU with the highest CLT's CLL count (FIG. 2, step 216) and a cache line is evicted, CLL count for that CPU is decremented (FIG. 2, step 220) and at this stage the algorithm ends as new cache line could be loaded.

If CLT's CLL count is not more than a minimum threshold value, the 2nd CPU cache performance value: miss rate is examined (FIG. 2, step 214). If the miss rate is above the threshold value, LRU is applied to the cache lines corresponding to the CPU with the highest CLT's CLL count (FIG. 2, step 216) and a cache line is evicted, CLL count for that CPU is decremented (FIG. 2, step 220) and at this stage the algorithm ends as new cache line could be loaded. If the miss rate is not above the threshold value, LRU is applied to the cache lines corresponding to the CPU with the lowest load rate (FIG. 2, step 218) and a cache line is evicted, CLL count for that CPU is decremented (FIG. 2, step 220) and at this stage the algorithm ends as new cache line could be loaded.

Another embodiment of this invention is a method of cache eviction for a multiple core central processing unit comprising of a multiple core central processing unit sharing a last-level cache; loading a first cache line to a first cache; a first core among the multiple core central processing unit requesting a load in the first cache; wherein the first core has an identification number; marking the first cache line with the identification number of the first core; a cache load tracker keeping track of numbers of cache lines loaded into a cache per individual core among the multiple core central processing unit.

If a first number among the numbers of cache lines loaded into a cache per individual core exceeds a first threshold, reducing all the numbers of cache lines loaded into a cache per individual core other than the first number, proportionally, such that the cache load tracker is not overflowed; the cache load tracker further measuring load rate and miss rate; the cache load tracker recording the load rate and the miss rate on separate memory locations; the cache load tracker taking a running average over a first predetermined number of the most recent misses; storing the identification number of the first core in a second predetermined number of first-in-first-out queue of first memory locations.

If the first cache is full, evicting a second cache line by applying a least-recently-used filtering method on the second cache line. If the first number among the numbers of cache lines loaded into a cache per individual core exceeds a second threshold or the miss rate exceeds a third threshold, applying the least-recently-used filtering method on cache lines corresponding to a core with the largest number among the numbers of cache lines loaded into a cache per individual core. If the first number among the numbers of cache lines loaded into a cache per individual core does not exceed a second threshold and the miss rate does not exceed a third threshold, applying the least-recently-used filtering method on cache lines corresponding to a core with the lowest miss rate.

Any variations of the above teaching are also intended to be covered by this patent application. This can apply to a system, apparatus, or device with cache for microprocessor, processor, server, PC, or mobile device, applying the method above.

The invention claimed is:

1. A method of cache eviction for a multiple core central processing unit, said method comprising the steps of:
    said multiple core central processing unit sharing a last-level cache;
    loading a first cache line to a first cache;
    a first core among said multiple core central processing unit requesting a load in said first cache;
    wherein said first core has an identification number;
    marking said first cache line with said identification number of said first core;
    a cache load tracker keeping track of counts of cache lines loaded into said first cache for each individual core among said multiple core central processing unit;
    when a count of said first core's cache lines loaded into said first cache exceeds a first threshold, reducing all said counts of cache lines loaded into said first cache for each individual core, proportionally, such that said cache load tracker is not overflowed;
    said cache load tracker further measuring load rate and miss rate for each individual core;
    said cache load tracker recording said load rate and said miss rate on separate memory locations;
    said cache load tracker taking a running average over a first predetermined number of most recent misses;
    storing said identification number of said first core in a second predetermined number of first-in-first-out queues of first memory locations;
    when said first cache is full and all said counts of cache lines loaded into said first cache for each individual core are equal, evicting a least-recently-used cache line corresponding to any core not responsible for said load in said first cache;
    when said count of said first core's cache lines loaded into said first cache exceeds a second threshold or said miss rate for said first core exceeds a third threshold, evicting a least-recently-used cache line corresponding to a core with the largest said count of cache lines loaded into said first cache; and
    when said count of said first core's cache lines loaded into said first cache does not exceed said second threshold and said miss rate for said first core does not exceed said third threshold, evicting a least-recently-used cache line corresponding to a core with the lowest load rate.

* * * * *